Patented Nov. 28, 1933

1,937,272

UNITED STATES PATENT OFFICE 1,937,272

PREPARATION OF DIACETONE ALCOHOL

Henri Guinot, Melle (Deux-Sevres), France, assignor to Usines de Melle, Melle, France, a corporation of France No Drawing. Application July 23, 1930
Serial No. 470,028

13 Claims. (Cl. 260—134)

The present invention relates to the production of diacetone alcohol by the catalytic polymerization of acetone. More especially, it pertains to an improved process for the manufacture of diacetone alcohol by means of the catalytic action of alcoholic or aqueous-alcoholic solutions of extremely small quantities of alkalies upon acetone.

It has long been known that diacetone alcohol can be obtained by the condensation of acetone by means of alkaline earth bases, e. g., lime, barite, strontia, which are insoluble therein. The use of alkali and alkaline earth bases has also been disclosed in a number of patents, for example, U. S. Patent 1,066,474 by Doerflinger, U. S. Patent 1,075,284 by Crockett, U. S. Patent 1,082,424 by Hoffmann, U. S. Patent 1,550,792 by Edmonds and U. S. Patent 1,701,473 by Ellis.

According to Doerflinger's process (U. S. Patent 1,066,474), acetone is condensed to diacetone alcohol by the aid preferably of an alkali metal hydroxide such as potassium hydroxide, about 0.0186 mol. of the latter per liter of acetone being employed. The catalyst is dissolved in a solvent such as methyl alcohol in the proportion of 8.3 liters per 100 liters of acetone. This mixture is allowed to stand at atmospheric temperature in a suitable closed vessel for about 48 hours, at the end of which time the solution is supposed to contain about 20% diacetone alcohol. The caustic potash used as a catalyst is then neutralized and the methyl alcohol and excess of acetone removed by fractional distillation, and the diacetone alcohol finally vacuum distilled. Altho Doerflinger states that yields of 20% are thus obtained, it can easily be shown that this figure was incorrect, his error being in determining the amount of diacetone alcohol present by the specific gravity of the reaction product which contained other condensation products due to the procedure employed.

In a comparatively recent patent (U. S. Patent 1,701,473) Ellis has disclosed a process of producing diacetone alcohol which comprises essentially treating neutral and ester-free acetone with about 0.01 to .02% of alkali metal hydroxide such as potassium hydroxide, in the absence of a solvent therefor. The reaction is allowed to take place at room temperature (20°-30° C.) with agitation. At the end of 19 hours, or in somewhat less time if continuous agitation is employed, a yield of approximately 12% diacetone alcohol is obtained. At the end of the reaction, the alkali is neutralized and the diacetone alcohol recovered by fractional distillation.

It is well known that condensation reactions involving the use of alkaline condensing agents are dependent upon the concentration of alkali employed. Koelichen, who studied the mechanics of the diacetone alcohol condensation, stated that the reaction velocity was proportional to the hydroxyl ion concentration. It is further known that lowering the temperature usually results in a reduction of the reaction velocity. Ellis stated in his specification that "low temperatures tend to increase the time factor, and high temperatures to decrease same".

I have now found, contrary to expectations in view of these statements by previous workers, that the concentration of alkali may be reduced to less than one-tenth the lower limit specified by the above-mentioned investigators; that the temperature may be materially lowered; and that contrary to expectation, when both these factors are lowered, the yields are not diminished, and the reaction time is not only not increased but is actually reduced to about one-fourth the time specified for the old processes. Further advantages of my process will be brought out in the following discussion.

My improved process may best be illustrated by means of a specific example. It is distinctly understood, however, that it is possible to deviate somewhat from the procedure therein set forth without leaving the scope of my invention.

Example

To 500 kgs. of pure acetone, stirring and cooling well all the time, 0.800 liter of an alcoholic solution containing 40 grams of caustic potash is added. The potash is dissolved instantaneously in the acetone, giving a white vapor which is immediately dispersed. After about 2-5 hours time, the alkalinity of the solution is neutralized by means of an acetonic or alcoholic solution capable of producing salt which is insoluble in acetone, for example, sulfuric acid. This is filtered and then distilled to separate the diacetone alcohol. Taking into account the acetone recovered, the yield is quantitative.

For optimal results a number of factors should be carefully regulated. Previous to the introduction of the alcoholic solution of alkali metal hydroxide, the acetone should be cooled down to a temperature of 8° to 10° C. and during the addition of the alkali and the reaction which ensues the temperature should preferably not be allowed to rise above 10° C. At such temperatures it is possible to transform about 14% of the acetone to diacetone alcohol, as compared to only about 10% at 20° C.

A second point of importance is that the alkali be introduced into the acetone in the form of an alcoholic or aqueous-alcoholic solution. The amount of solvent employed, however, should not be more than 0.1 to 0.2% of the total liquids. The only object of the alcohol is to render the alkali instantaneously soluble in the reaction mixture. Hence, if too large a volume of alcohol is employed the catalyst is needlessly diluted. Furthermore, if excessive amounts of alcohol are used the difficulty and cost of separating it from the reaction product are materially increased. This is well illustrated by the fact that Doerflinger (U. S. Patent 1,066,474) had to submit his crude diacetone alcohol to rectification under vacuum in order to separate the prohibitive quantity of alcohol with which his product was contaminated. Since in my improved process only about one-hundredth as much alcohol is required, only traces of alcohol remain in the diacetone alcohol and no special treatment is required on account of its purity.

Adding the alkali catalyst in the form of a solution serves a very important purpose, provided excessive quantities of the solvent are not thereby introduced. By adding the catalyst in solution form, it is quickly brought into contact with all parts of the reaction mixture and consequently begins to act immediately and continues to do so without the necessity of continuous agitation.

According to the improved method of procedure disclosed herein, the catalyst is not only employed in the particular form in which the optimal results are obtained but of at least equal importance is the fact that the actual amount of catalyst employed is very carefully regulated and maintained below the point where an appreciable resinification takes place. It has now been discovered that the most satisfactory general results are obtained provided the catalyst is used in an amount not exceeding about 1/1000 mol. per liter of acetone being treated. Certain grades of acetone are distinctly acid in character, and due to this fact ordinarily considerable difficulty would be experienced in adding just the right quantity of catalyst when using such small quantities. In the present case, however, this difficulty is easily avoided by the use of two indicators registering changes in color with slight changes in the hydrogen ion concentration. Both of these indicators are added to the acetone and alcoholic solution of the alkali introduced until the first of these indicators, namely, cresol red, registers an alkaline reaction, but the other indicator—orthocresolphthalein—is not affected. With this amount of alkali the reaction is usually complete in 2-5 hours. With a larger amount of alkali the length of time required for the reaction to be completed is decreased, but it is not advisable to terminate it in less than half an hour.

When the reaction has been completed the reaction mixture is just neutralized with an acid such as sulfuric acid and then filtered preferably thru two filters connected in series. The diacetone alcohol is finally recovered by fractional distillation.

As readily seen from the foregoing description the present process possesses a number of obvious advantages over previous processes. For example, an important saving is made in the decreased amount of catalyst employed as well as in the slight consumption of acid required to neutralize the catalyst at the end of the reaction. The small amount of salts present in the reaction product is conducive to easy and complete removal of this material. In prior processes the expense and difficulty resulting from the use of large amounts of catalyst detracted materially from the effectiveness of the process. By the employment of the limited amount of catalyst specified herein an appreciable saving in raw material is effected due to the fact that appreciable quantities of resinous materials are not formed. For the same reason a purer grade of material is produced. The present process also effects a striking saving in time over that required for previous processes. With the same equipment it is possible to produce by the present process approximately ten times as much diacetone alcohol than by previous methods.

In the example cited above the use of an alcoholic solution of potassium hydroxide as the catalyst has been described. It is understood, of course, that certain equivalent substances may also be used with equally satisfactory results. For example, instead of potassium hydroxide there may be employed other alkali metal or alkaline earth metal bases which are soluble in comparatively small quantities of the particular solvent chosen, e. g., sodium hydroxide, barium hydroxide, etc. In place of ethyl alcohol, other solvents for the alkaline bases may be used, such as methyl alcohol. The important point in either case is to introduce the catalyst into the acetone in the form of a solution, and the solvent used should be such that, if need be, it can be completely removed from the diacetone alcohol. It is preferable, however, to employ a solvent the presence of traces of which will not be undesirable. It is preferred also to use a solvent which needs to be used only in quantities substantially less than 1% of that of the acetone being treated. With such quantities it is usually not necessary to separate the solvent from the reaction product.

What is claimed is:

1. In the process of producing diacetone alcohol by the catalytic condensation of acetone, the improvement which comprises subjecting acetone to the action of an alkaline condensing agent dissolved in a solvent which is miscible with acetone and diacetone alcohol, said condensing agent being present, as free alkali, in an amount of the order of about one-thousandth mol. per liter of acetone.

2. In the process of producing diacetone alcohol by the catalytic condensation of acetone, the improvements which comprise subjecting one hundred parts of acetone to the action of not more than one part by volume of a solution comprising essentially a solvent which is miscible with acetone and diacetone alcohol, and an alkaline condensing agent, said condensing agent being present as free alkali, in an amount of the order of about one-thousandth mol. per liter of acetone.

3. In the process of producing diacetone alcohol by the catalytic condensation of acetone, the improvements which comprise subjecting acetone, at sub-atmospheric temperatures, to the action of an alkaline condensing agent dissolved in a solvent which is miscible with acetone and diacetone alcohol, said condensing agent being present, as free alkali, in an amount of the order of about one-thousandth mol. per liter of acetone.

4. In the process of producing diacetone alcohol by the catalytic condensation of acetone, the improvements which comprise subjecting acetone, at temperatures below 10° C. to the action of an alkaline condensing agent dissolved in a solvent which is miscible with acetone and diacetone alcohol, said condensing agent being present, as free alkali, in an amount of the order of about one-thousandth mol. per liter of acetone.

5. In the process of producing diacetone alcohol by the catalytic condensation of acetone, the improvements which comprise subjecting one hundred parts of acetone, at temperatures of about 6–10° C., to the action of not more than one part by volume of a solution comprising essentially a solvent which is miscible with acetone and diacetone alcohol, and an alkaline condensing agent, said condensing agent being present, as free alkali, in an amount of the order of about one-thousandth mol. per liter of acetone.

6. In the process of producing diacetone alcohol by the catalytic condensation of acetone, the improvements which comprise subjecting acetone at temperatures below 10° C. to the action of an alkali metal hydroxide dissolved in a solvent which is miscible with acetone and diacetone alcohol, said alkali metal hydroxide being present, as free alkali, in an amount of the order of about one-thousandth mol. per liter of acetone.

7. In the process of producing diacetone alcohol by the catalytic condensation of acetone, the improvements which comprise subjecting 100 parts of acetone, at temperatures below 10° C., to the action of not more than one part by volume of an alcoholic or aqueous-alcoholic solution containing an alkali metal hydroxide, said alkali metal hydroxide being present, as free alkali, in an amount of the order of about one-thousandth mol. per liter of acetone.

8. In the process of producing diacetone alcohol by the catalytic condensation of acetone, the improvements which comprise subjecting 100 parts of acetone, at temperatures below 10° C., to the action of not more than one part by volume of an alcoholic or aqueous-alcoholic solution containing potassium hydroxide, said potassium hydroxide being present, as free alkali, in an amount of the order of about one-thousandth mol. per liter of acetone.

9. In the process of producing diacetone alcohol by the catalytic condensation of acetone, the improvement which comprises subjecting acetone to the action of a proportion of alkali condensing agent determined by the turning point of cresol red but without reaching the turning point of ortho-cresol phthalein.

10. In the process of producing diacetone alcohol by the catalytic condensation of acetone, the improvements which comprise subjecting acetone, at temperatures below 10° C. to the action of a proportion of alkali condensing agent, determined by the turning point of cresol red but without reaching the turning point of ortho-cresol phthalein.

11. In the process of producing diacetone alcohol by the catalytic condensation of acetone, the improvements which comprise subjecting acetone to the action of a proportion of alkali condensing agent, determined by the turning point of cresol red but without reaching the turning point of ortho-cresol phthalein, said condensing agent being added in the form of a solution in just sufficient alcohol to dissolve it.

12. In the process of producing diacetone alcohol by the catalytic condensation of acetone, the improvements which comprise subjecting acetone for a period of 2 to 5 hours at subatmospheric temperatures to the action of an alkaline condensing agent dissolved in a solvent which is miscible with acetone and diacetone alcohol, said condensing agent being present, as free alkali, in an amount of the order of about one-thousandth mol. per liter of acetone.

13. In the process of producing diacetone alcohol by the catalytic condensation of acetone, the improvements which comprise subjecting acetone for a period of 2 to 5 hours at temperatures of about 6–10° C., to the action of an alkaline condensing agent dissolved in a solvent which is miscible with acetone and diacetone alcohol, said condensing agent being present, as free alkali, in an amount of the order of about one-thousandth mol. per liter of acetone.

HENRI GUINOT.

CERTIFICATE OF CORRECTION.

Patent No. 1,937,272.  November 28, 1933.

HENRI GUINOT.

It is hereby certified that error appears in the printed specification of the above numbered patent requiring correction as follows: Page 2, lines 60 to 63, strike out the sentence "With a larger amount of alkali the length of time required for the reaction to be completed is decreased, but it is not advisable to terminate it in less than half an hour."; and that the said Letters Patent should be read with this correction therein that the same may conform to the record of the case in the Patent Office.

Signed and sealed this 30th day of January, A. D. 1934.

(Seal)

F. M. Hopkins
Acting Commissioner of Patents.